Sept. 11, 1928.  
L. G. RATH  
1,683,802
DIRIGIBLE HEADLIGHT
Filed June 24, 1926
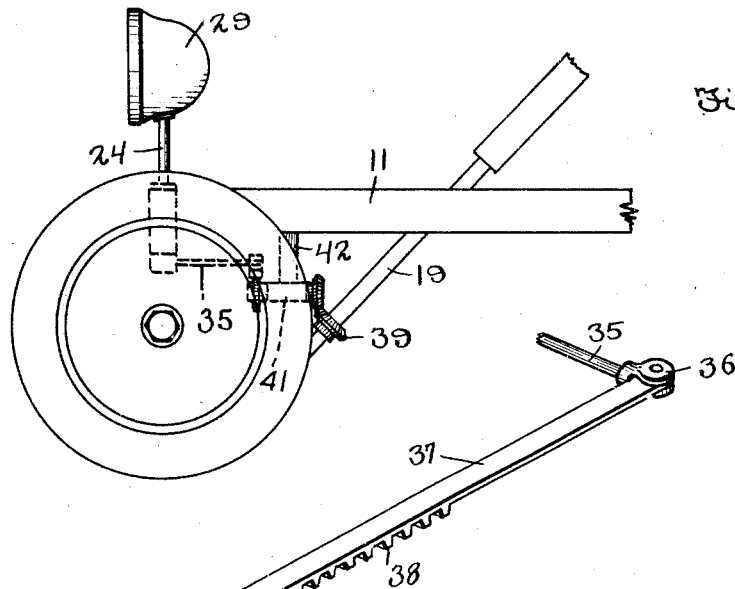
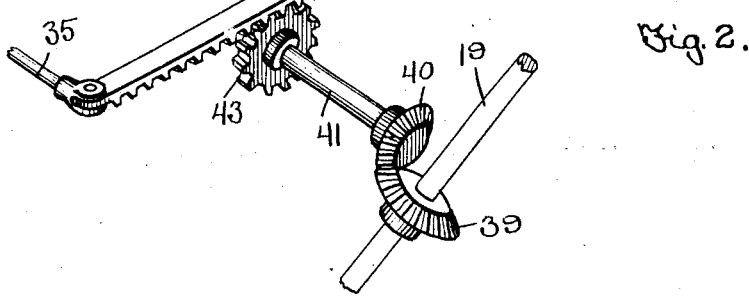
Lewis G. Rath, Inventor
Witnesses
By Richard B. Owen, Attorney Patented Sept. 11, 1928.

1,683,802

UNITED STATES PATENT OFFICE.

LEWIS G. RATH, OF PINE LAWN, MISSOURI.

DIRIGIBLE HEADLIGHT.

Application filed June 24, 1926. Serial No. 118,280.

The present invention relates to improvements in dirigible headlights and has for its primary object to provide a structure whereby the headlights of a vehicle will be turned simultaneously with the front wheels of the vehicle to direct the rays in the path of travel of the vehicle.

A further object of the invention is the provision of a dirigible headlight construction whereby the turning movement of the headlights will be accomplished with convenience and facility.

Still another object of the invention is the provision of a dirigible headlight structure designed so as to be conveniently mounted upon automobiles and similar vehicles, and which will operate efficiently.

Another object of the invention is the provision of a dirigible headlight structure which is simple and durable of construction as well as inexpensive to manufacture.

Other objects and advantages of the invention will become apparent as the description progresses.

In the accompanying drawing, forming a part of this specification and in which like reference characters are employed to denote like parts throughout the same:

Figure 1 is a fragmentary side elevational view of a vehicle chassis showing my invention in operative position thereon, Figure 2 is a fragmentary perspective view of the operating mechanism.

In the drawing the chassis of the automobile upon which the headlight mechanism of the invention is installed, is indicated by the numeral 11, and the steering column is indicated by the numeral 19, upright posts 24 being mounted at the front of the chassis and supporting at their upper ends the headlights which are indicated by the numeral 29. The lower extremities of the headlight posts 24 carry rearwardly projecting arms 35 on the rear ends of which are formed bifurcated apertured ears 36. Pivoted at its ends between the ears 36 and extending transversely of the chassis is a connecting bar 37. Formed on the lower side of the connecting bar 37 adjacent one end is a series of rack teeth 38 the purpose of which will later appear. A bevel gear 39 is rigidly secured to the steering column 19 adjacent the lower end thereof with its beveled periphery presented upwardly. This bevel gear meshes with a second bevel gear 40 fixed upon the rear end of a stub shaft 41 and located above the gear 39. The stub shaft 41 is rotatably supported in a horizontal position by means of a bracket 42 and carries upon its forward end a spur gear 43. The spur gear 43 is in mesh with the rack teeth 38 so that rotary movement of the steering column will impart rotary movement to the stub shaft and effect transverse reciprocable movement of the rack bar 37.

It will be evident that transverse movement of the rack bar 37 will effect a swinging movement of the arms 35, in unison with each other, so as to in turn effect angular adjustment of the headlights 29.

This construction provides a simple arrangement whereby operation of the usual steering mechanism of a vehicle will effect angular adjustment of the headlights in accordance with adjustment of the front vehicle wheels, so that the rays from the headlights will be projected forwardly in the path of travel of the vehicle at all times. An essential feature of this construction resides in the simplicity of installation and the convenience with which the parts may be replaced.

Having thus described my invention, I claim:

In a dirigible headlight apparatus for automobiles, the combination with the rotary steering column of the automobile, of a pair of upright supporting posts mounted upon the automobile for turning movement, a headlight supported by each of said posts, an arm secured to the lower end of each of said posts and extending rearwardly therefrom, a bar pivotally connected at its ends to the rear ends of said arms and extending between the same, the bar being provided upon its under side with a series of rack teeth, a shaft journaled horizontally upon the frame of the automobile in rear of said bar, a pinion fixed upon the forward end of the shaft and meshing with the rack teeth upon the under side of the bar and constituting means for supporting the bar against downward displacement, a beveled pinion fixed upon the rear end of the shaft, and a bevel gear fixed upon the steering column and meshing with the under side of the periphery of the bevel gear.

In testimony whereof I affix my signature.

LEWIS G. RATH.